United States Patent [19]

Narula

[11] Patent Number: 4,874,547

[45] Date of Patent: Oct. 17, 1989

[54] BI-MODAL SILICONE EMULSIONS, SILICONE EMULSIFICATION PROCESS AND EMULSIONS THEREFROM

[75] Inventor: Dipak Narula, Midland, Mich.

[73] Assignee: Dow Corning Corporation, Midland, Mich.

[21] Appl. No.: 718,985

[22] Filed: Apr. 2, 1985

[51] Int. Cl.$^4$ .................... B01J 13/00; C09K 3/00
[52] U.S. Cl. ....................... 252/312; 106/287.13; 106/287.14; 106/38.22; 252/314; 252/DIG. 1; 424/65; 514/941
[58] Field of Search .......................... 252/312, 314; 106/287.13, 287.14; 514/941

[56] References Cited

U.S. PATENT DOCUMENTS

| | | | |
|---|---|---|---|
| 2,697,674 | 12/1954 | Eisen | 252/312 X |
| 2,702,276 | 2/1955 | Green | 252/8.6 |
| 2,755,194 | 7/1956 | Volkmann et al. | 106/285 |
| 2,891,920 | 6/1959 | Hyde et al. | 260/29.2 |
| 3,294,725 | 12/1966 | Findlay et al. | 260/29.2 |
| 3,360,491 | 12/1967 | Axon | 260/29.2 |
| 3,634,285 | 1/1972 | Brooks | 252/312 |
| 3,635,834 | 1/1972 | Cilento et al. | 252/314 |
| 3,795,538 | 3/1974 | Evans et al. | 117/139.5 A |
| 3,925,242 | 12/1975 | Sagi et al. | 252/312 X |
| 4,009,117 | 2/1977 | Newingham et al. | 252/314 X |
| 4,177,177 | 12/1979 | Vanderhoff et al. | 260/29.2 M |
| 4,194,988 | 3/1980 | Schneider et al. | 252/312 |
| 4,501,619 | 2/1985 | Gee | 106/287.14 X |
| 4,509,981 | 4/1985 | Sanders, Jr. et al. | 106/287.16 X |

FOREIGN PATENT DOCUMENTS 2079300 4/1984 United Kingdom.

Primary Examiner—Richard D. Lovering
Attorney, Agent, or Firm—George A. Grindahl

[57] ABSTRACT

Silicone-in-water emulsions are prepared wherein the silicone phase as bi-modal and contains at least 25 percent volatile silicone and at least 1 percent high viscosity silicone fluid. The silicone emulsions are particularly useful in skin care compositions. The silicone-in-water emulsions are prepared by a process which is useful to emulsify any high viscosity silicone or mixture of silicones having a viscosity of less than 50 pascal-seconds. The process involves the formation of a rough emulsion followed by the use of low shear, preferably at about room temperature to form a stable emulsion.

20 Claims, No Drawings

BI-MODAL SILICONE EMULSIONS, SILICONE EMULSIFICATION PROCESS AND EMULSIONS THEREFROM

BACKGROUND OF THE INVENTION

The present invention relates generally to silicone-in-water emulsions and, specifically, to a process for emulsifying a high viscosity silicone in water, using only nonionic surfactants, and to the emulsions obtained therefrom. In a particular aspect the present invention relates to a process for emulsifying a bi-modal silicone fluid comprising a polydimethylsiloxane having a viscosity of at least 30,000 centipoise at 25° C. and a substantial amount of a volatile polydimethylsiloxane.

Aqueous emulsions of silicones, including high viscosity silicones, have been prepared by emulsion polymerization of a silicon-containing monomer (Hyde et al., U.S. Pat. No. 2,891,920; Findlay et al., U.S. Pat. No. 3,294,725; and Axon, U.S. Pat. No. 3,360,491) and by direct emulsification of a preformed silicone (Green, U.S. Pat. No. 2,702,276; Volkmann et al., U.S. Pat. No. 2,755,194 and Schneider et al., U.S. Pat. No. 4,194,988). However, these processes use one or more surfactants of the ionic type for the formation and/or stabilization of the emulsion and are therefore not suitable for use in the many applications which require the absence of anionic or cationic species in the emulsion.

Evans et al., U.S. Pat. No. 3,795,538 teach a process for emulsifying a polydiorganosiloxane fluid in water using only nonionic surfactants. However, bi-modal silicone emulsions and the necessary use of a low shear generating means coupled with low temperature control of the emulsion being sheared are not contemplated therein.

Vanderhoff et al., U.S. Pat. No. 4,177,177, teach a two-step process for emulsifying a polymer phase having a viscosity of less than about 10,000 centipoise in an aqueous medium containing at least one oil-in-water functioning emulsifier, in the presence of an additive to increase the stability of the final emulsion. However, Patentees' process is not a low shear, low temperature process that is needed to emulsify a bi-modal silicone fluid.

As disclosed in a copending application Ser. No. 718,984 for U.S. patent entitled "Substantive Skin Care Compositions Comprising a Polydimethylsiloxane", filed on even date herewith and assigned to the assignee of the present invention, and now abandoned the incorporation of a polydimethylsiloxane having a viscosity of at least 30,000 centipoise into a skin care composition increases the skin-substantivity of a skin care component formulated therein. While such high viscosity silicones can be incorporated into a nonaqueous skin care composition with the aid of a solvent therefore, their incorporation into an aqueous skin care composition has been prevented by the lack of a suitable aqueous emulsion thereof. The present invention provides those suitable aqueous emulsions.

Because of the presence of two silicones having widely differing viscosities a bi-modal silicone component presents a particularly difficult challenge to existing emulsification processes. Thus, whereas the volatile (low viscosity) silicone portion of a bi-modal silicone component is normally easily reduced to a submicron emulsion particle, the high viscosity portion thereof is not. Surprisingly, the use of suitable surfactants and less shear and low temperature rather than more shear and higher temperature, provides suitable aqueous emulsions of a bi-modal silicone fluid.

BRIEF SUMMARY OF THE INVENTION

It is a particular object of the present invention to provide an emulsion of a bi-modal silicone fluid comprising a substantial amount of a volatile polydimethylsiloxane and a high viscosity, nonvolatile polydimethylsiloxane. It is further an object of this invention to provide a silicone-in-water emulsion of a high viscosity silicone, and a process therefor, that comprises only nonionic surfactants. It is also an object of this invention to provide a process for preparing an aqueous emulsion of a polydimethylsiloxane having a viscosity of at least 30,000 centipoise.

These objects, and others which will become apparent upon considering the following disclosure and appended claims, are obtained by the emulsion compositions of this invention, and the process therefor which comprises preparing a rough emulsion in water of a high viscosity polydimethylsiloxane, or a mixture thereof with a volatile polydimethylsiloxane, having a viscosity of up to 50,000 centipoise and further processing the rough emulsion under conditions of low shear and low temperature to reduce the average particle size of the polydimethylsiloxane to a value of less than about 2 micrometers. The amounts and types of surfactants that are used in this invention are critical and permit the formation of an emulsion and the proper selection and control of the emulsifying means is also critical and leads to the formation of the necessary particle size of the polydimethylsiloxane fluid, especially the high viscosity polydimethylsiloxane portion of a bi-modal silicone fluid.

DETAILED DESCRIPTION OF THE INVENTION

In one aspect the present invention relates to an emulsification process, and to the emulsions obtained therefrom, said emulsification process comprising (I) intimately mixing components consisting essentially of (A) 100 parts by weight of a polydimethylsiloxane fluid having a viscosity of up to 50 pascal-seconds at 25° C. and consisting essentially of from 1 to 100 parts by weight of (i) a nonvolatile polydimethylsiloxane portion having a viscosity of at least 30 pascal-seconds at 25° C. and from 0 to 99 parts by weight of (ii) a volatile polydimethylsiloxane portion and (B) from 1 to 5 millimols, per millimol of primary surfactant, of a nonionic secondary surfactant having an HLB number of from 7 to 9, (II) intimately mixing with the mixture of (I) components consisting essentially of (C) at least 3 millimols of a nonionic primary surfactant having an HLB number of from 13 to 15 and (D) an emulsion-forming amount of water to form a rough silicone-in-water emulsion, and (III) subjecting the rough emulsion to the comminuting action of a low shear generating means for a period of time sufficient to reduce the average particle size of the silicone to a value less than about 2 micrometers; the temperature of the emulsion being maintained at a value of from about 1° to 40° C. during said subjecting.

In a related aspect the present invention also relates to a bi-modal silicone-in-water emulsion composition consisting essentially of (A) 100 parts by weight of a bi-modal polydimethylsiloxane fluid component having a viscosity of up to 50 pascal-seconds at 25° C. and consisting essentially of (i) 1 to 75 parts by weight of a nonvolatile polydimethylsiloxane portion having a viscosity at 25° C. of at least 30 pascal-seconds and (ii) 25 to 99 parts by weight of a volatile polydimethylsiloxane portion, (B) from 1 to 5 millimols, per millimol of primary surfactant, of a nonionic secondary surfactant having an HLB number of from 7 to 9, (C) at least 3 millimols of a nonionic primary surfactant having an HLB number of from 13 to 15, and (D) an emulsion-forming amount of water.

Herein the term silicone and the term polydimethylsiloxane are regarded as being synonymous and are used interchangeably. Me denotes the methyl radical.

In the process and compositions of this invention the polydimethylsiloxane fluid component (A) has the unit formula

and consists of two or more of said units arranged in a cyclic and/or substantially linear molecular structure. Cyclic polydimethylsiloxanes have the formula $(Me_2SiO)_x$ wherein x has a value of at least 3. Substantially linear polydimethylsiloxanes have the formula $R(Me_2SiO)_ySiMe_2R$ wherein y has a value of at least 1 and R denotes a terminal radical such as hydroxy or alkoxy or hydrocarbyl, preferably having 1 to 6 carbon atoms, such as methyl, ethyl, vinyl and phenyl. Preferably R is methyl or hydroxy.

The viscosity of the silicone component (A) at 25° C. can have any value of up to 50 pascal-seconds (50,000 centipoise); however, for ease of handling it is preferably limited to no more than 20 pascal-seconds and, most preferably, to less than 10 pascal-seconds. By the term high viscosity it is meant herein at least about 30 pascal-seconds.

The silicone component (A) can consist essentially of a nonvolatile polydimethylsiloxane portion or a mixture of a nonvolatile polydimethylsiloxane portion and a volatile polydimethylsiloxane portion.

For example, silicone component (A) can consist essentially of only a nonvolatile silicone having a viscosity at 25° C. of from 30 to 50 pascal-seconds. Alternatively, the nonvolatile silicone can further comprise the normal amount, typically from 9 to 13 percent by weight, of volatile polydimethylsiloxanes that are produced during the normal siloxane equilibration process for preparing silicones. In addition the silicone component (A) can consist essentially of a nonvolatile silicone and a larger-than-normal amount of volatile polydimethylsiloxanes, such as 15, 20, 25 and more percent by weight.

Herein the distinction between a volatile silicone and a nonvolatile silicone is based on the normal boiling point of the silicone. Polydimethylsiloxanes which have a normal boiling point of less than 250° C. are designated as volatile silicones. All other silicones are designated as nonvolatile silicones.

Examples of volatile silicones suitable for use in this invention include cyclopolydimethylsiloxanes having the formula $(Me_2SiO)_x$ wherein x denotes 3, 4, 5 and 6 and methyl-terminated linear polydimethylsiloxanes having the formula $Me(Me_2SiO)_ySiMe_3$ wherein y has a value of 1, 2, 3 and 4.

As noted above, a nonvolatile silicone has a normal boiling point of at least 250° C. In terms of viscosity a nonvolatile silicone for the purposes of this invention also has a viscosity at 25° C. of at least 30 pascal-seconds (30,000 centipoise), such as 30,000, 60,000, 100,000, 1,000,000 centipoise and more. For nonvolatile silicones having a viscosity exceeding 10 million centipoise it is preferred to use the well-known units of plasticity number as delineated in ASTM D926-67. Thus, for silicone viscosities ranging from 10 million to 20 million to 40 million to 80 million centipoise, corresponding values of plasticity number for a substantially linear silicone will range from 130 to 146 to 165 to about 203, respectively. Correspondingly, the number average molecular weight will range from about 55,000 to about 350,000 as the viscosity ranges from 30 pascal-seconds to 100 kilopascal-seconds A preferred silicone component (A) for the process of this invention and for the composition of this invention is a bi-modal silicone component. By a bi-modal silicone component it is meant herein a silicone that consists essentially of a substantial amount, such as for example, from 25 to 99 percent by weight of a volatile silicone portion and from 1 to 75 percent by weight of a nonvolatile silicone portion having a viscosity of at least 30 pascal-seconds at 25° C.

A bi-modal silicone component is preferred for at least two reasons. First, the presence of a substantial amount of volatile, and hence low viscosity, silicone portion reduces the viscosity of the silicone component (A), preferably to less than 10,000 centipoise, thereby allowing the use of a nonvolatile silicone portion having a viscosity of at least 30,000 centipoise, and preferably at least 10,000,000 centipoise (10 kilopascal-seconds). Second, a bi-modal silicone component has a bi-modal efficacy in personal care compositions, i.e., the well-known efficacy of volatile silicones plus the recently discovered substantivity-enhancing efficacy of a high viscosity silicone for certain skin care components, as well as other desirable effects such as water-repellency and lubrication.

A highly preferred silicone component (A) for the process and compositions of this invention is a bi-modal silicone having a viscosity of less than 10 pascal-seconds and consisting essentially of 80 to 90 parts by weight of a volatile silicone selected from octamethylcyclotetrasiloxane, decamethylcyclopentasiloxane, and their mixtures, and 10 to 20 parts by weight of a nonvolatile silicone having a viscosity of at least 10 million centipoise (10 kilopascal-seconds) at 25° C.

It should be noted that the emulsions of this invention that are prepared from a bi-modal component (A) will have emulsion particles of widely varying sizes.

The process and compositions of this invention incorporate a nonionic secondary surfactant component (B) and a nonionic primary surfactant component (C) to aid in the formation and stabilization of the silicone-in-water emulsions.

Nonionic surfactants are well known and need no detailed explanation herein. Nonionic surfactants suitable for use herein are principally of the ethoxylated substrate type wherein the substrate is selected from hydrophobic alcohols, acids, amides and polyoxypropylenes. The suitable surfactants therefore have ES, ESE and SES molecular structures wherein E denotes a polyoxyethylene moiety and S denotes a hydrophobic substrate. For the purposes of this invention the nonionic surfactants are preferably of the ES structure wherein S denotes an alkylphenol substrate.

The primary and secondary surfactants that are used in this invention can be of the same or different type, provided they are nonionic. Said surfactants are preferably both of the ethoxylated substrate type. Most preferably component (B) and component (C) are ethoxylated alkylphenols.

Component (B), the secondary surfactant that is used in this invention, can be any nonionic surfactant having an HLB number of from 7 to 9; however it is preferably an ethoxylated alkylphenol such as, for example, octylphenoxypolyethllene oxide containing an average of about 3 ethylene oxide units per molecule and having the CTFA name of octoxynol-3.

The reader is referred to "CTFA Cosmetic Ingredient Dictionary", Third Ed., 1982; the Cosmetic, Toiletry and Fragrance Association, Inc.; Washington, D.C. 20005, hereby incorporated by reference to further delineate the octoxynol nomenclature.

The HLB number of a surfactant is a well-known quantity and needs no explanation herein. The reader is referred to "McCutcheon's Detergents and Emulsifier"; Ridgewood, N.J.; Allured Publishing Corp., incorporated herein by reference, for a comprehensive tabulation of surfactants in terms of HLB number, molecular structure, generic name and trade name.

Component (C), the primary surfactant that is used in this invention, is any nonionic surfactant having an HLB number of from 13 to 15. Any nonionic surfactant having an HLB number of from 13 to 15 can be used in this invention as the primary surfactant; however, it is preferably an ethoxylated alkylphenol such as, for example, octylphenoxypolyethylene oxide containing an average of about 13 ethylene oxide units per molecule and having the CTFA name of octoxynol-13.

The amounts of the primary and secondary surfactants that are used in this invention are related to each other and to the amount of polydimethylsiloxane component (A) that is used.

Thus, for every 100 parts by weight of polydimethylsiloxane component (A) at least 3 millimols of primary surfactant (C) is used. Preferably the amount of primary surfactant that is used in this invention will be limited to no more than about 12 millimols per 100 parts by weight of component (A), and most preferably to about 6 millimols on the same basis.

Herein the term millimols is to be taken in the same sense as the term parts by weight is taken for component (A). Thus, if the term parts by weight is applied on a gram basis, for example, the term millimol is to be applied on a milligram-mol basis.

The amount of secondary surfactant (B) to be used in this invention is from 1 to 5, preferably 2 to 3, millimols for every millimol of primary surfactant that is used.

In terms of a preferred primary surfactant, i.e., $C_8H_{17}C_6H_4(OCH_2CH_2)_nOH$ wherein n has an average value of 13, and the preferred secondary surfactant, i.e., $C_8H_{17}C_6H_4(OCH_2CH_2)_nOH$ wherein n has an average value of 3, the amounts of each to use in this invention are from 2.3 to 9.3, most preferably 5, parts by weight of the former and from 2.2 to 8.9, most preferably from 4 to 6, parts by weight of the latter.

In the process and compositions of this invention the amount of water to be used for the preparation of the rough emulsion, hereinafter delineated, is not narrowly limited provided a rough emulsion can be formed with the amount used. For example, from 25 to 2000 parts by weight of water for every 100 parts by weight of polydimethylsiloxane (A) can be used. However, rough emulsions which are rich in water require longer periods of low shearing than rough emulsions which are rich in silicone. Consequently the amount of water to be used in this invention to form the rough emulsion is preferably limited to from 50 to 350 parts by weight, and most preferably 60 to 100 parts by weight, per 100 parts by weight of silicone component (A). The water that is used in this invention should be clear and clean and has been preferably deionized or distilled.

The compositions of this invention can be diluted with water, if desired. For example, an emulsion composition of this invention containing, for example, 50 percent by weight water, can be prepared with only a few minutes of low shear and then diluted with water to an emulsion composition of this invention containing as much as 95 percent water.

The process and composition of this invention can further incorporate nonessential components such as thickeners, biostats, freeze-thaw stabilizers, colorants and odorants which are commonly used in silicone-in-water emulsions and, particularly, in emulsions for personal care compositions.

The compositions of this invention are prepared by the process of this invention which comprises forming a rough emulsion comprising suitable amounts of the above-described polydimethylsiloxane component (A), the primary (B) and secondary (C) surfactants and the water (D) and thereafter further processing the rough emulsions to form a fine emulsion having an average silicone particle size of less than 2 micrometers.

The rough emulsion is prepared by intimately mixing, with stirring or other blending means, the polydimethylsiloxane component (A) and the secondary surfactant (B). The primary surfactant (C) is mixed with the water component (D) or, more preferably, with the mixture of polysiloxane and secondary surfactant. Lastly, the aqueous portion and silicone portion are intimately mixed, with stirring or other blending means, to form the rough emulsion. Heating can be used in preparation of the rough emulsion, if desired. Although it is permissable to mix the aqueous portion and the silicone portion in any desirable order, it is preferred that the aqueous portion be slowly admixed into the silicone portion containing (A) and (B), and preferably (C), to form the rough emulsion.

By the term rough emulsion it is meant herein an emulsion having transient stability against creaming, oiling and separation and having silicone emulsion particle sizes exceeding 2 micrometers, such as from 7 to 12 micrometers. Rough emulsions of bi-modal silicones frequently have a wide distribution of silicone particle sizes, e.g., 0.5 to 15 micrometers. The rough emulsion preferably has a room temperature stability against separation of at least 24 hours. It is additionally preferred that the viscosity at room temperature of the rough emulsion have a value of from about 100 to 2000 centipoise (millipascal-seconds).

The rough emulsion is next subjected to a particle size-reducing action until the average particle size of the silicone-in-water emulsion has been reduced to less than 2 micrometers, preferably to less than 0.5 micrometer and most preferably to a minimum value less than 2 micrometers.

The particle size-reducing action must be supplied by a low shear generating means. Examples of low shear generating means include, but are not limited to, mixers, such as an Eppenbach mixer; colloid mills having a gap setting of at least about 0.04 inches; and common centrifugal pumps typically used to pump liquids. Any other shear generating means which generates the low shear forces that are generated by the above-exemplified means can also be used in the process of this invention and is within the scope and spirit of this invention.

It is a characteristic of a low shear generating means that it is unable to form an emulsion of this invention with only a single exposure of the rough emulsion to the shear generating means when the silicone is bi-modal, as hereinabove defined. Consequently, in the process of this invention, the silicone-in-water emulsion must be repeatedly subjected to the comminuting action of the low shear generating means. For example, several passes of the emulsion through a suitably gapped colloid mill or a centrifugal pump is typically required to reduce the average particle size of a rough bi-modal emulsion to a minimum value.

Repeated subjecting of the emulsion to the low shear generating means can be done in any suitable manner, such as in a continuous manner or in a batch-wise manner. For example, the emulsion can be continuously pumped in a closed loop containing necessary piping and a centrifugal pump and, optionally, other liquid-handling components such as holding tanks, temperature-measuring and -controlling means, sampling means and flow-controlling means. Alternatively, the emulsion can be passed repeatedly, batch-wise through a colloid mill.

It is critical in the process of this invention that the temperature of the emulsion being subjected to the low shear generating means be kept between about 1° and 40° C., preferably between about 20° and 30° C., and most preferably around 25° C. in order to attain the desired particle size for the component (A).

Thus, if the rough emulsion has been heated above about 40° C. during its preparation, it must be cooled, preferably to about 25° C., before subjecting it to the low shear generating means. Likewise, if the temperature of the emulsion increases during said subjecting, it should not be allowed to exceed about 40° C., preferably 30° C. In the event that the temperature of the emulsion exceeds about 40° C., it must be cooled, preferably to about 25° C. before subjecting it to further shearing.

The compositions prepared by the method of this invention are expected to have the same utility as other silicone-in-water emulsions of the art such as in textile treating, paper coating when the nonvolatile silicone is curable and cured to the solid state and as mold release coating compositions. The bi-modal emulsion compositions of this invention have particular utility in the formulations of personal care composition such as skin care, antiperspirant, deodorant and hygiene compositions.

The emulsions of this invention are typically stable at room temperature for several days with respect to separation. However, if greater stability with respect to time and/or temperature is desired the viscosities of the compositions of this invention should be increased, preferably to a value of greater than about 1000 mPa.s (1000 centipoise) at 25° C. A suitable way of increasing said viscosities is with the inclusion therein of a suitable thickener for the aqueous phase. Typically said thickener is added to the emulsion after it has been formed.

Suitable thickeners include, among others, sodium alginate, gum arabic, polyoxyethylene, guar gum, hydroxypropyl guar gum, cellulose derivatives such as methylcellulose, methylhydroxypropylcellulose, hydroxypropylcellulose, polypropylhydroxyethylcellulose, starch and starch derivatives such as hydroxyethylamylose and starch amylose, locust bean gum, electrolytes such a NaCl, saccharides such as fructose and glucose, and derivatives of saccharides such as PEG-120 methyl glucose dioleate. Preferred thickeners include the cellulose derivatives and saccharide derivatives. The glucose derivative, PEG-120 methyl glucose dioleate, is especially preferred in the emulsions of the present invention.

The following examples are disclosed to further teach how to practice the present invention. They are not to be used to limit the invention which is properly delineated by the appended claims.

Viscosities were measured at 25° C. in units of centipoise and were converted to pascal-seconds for this disclosure by multiplying by 0.001. All parts and percentages are by weight. Plasticity numbers were measured according to ASTM D926-67 which is incorporated herein by reference.

EXAMPLE I

A bi-modal polydimethylsiloxane fluid, 100 parts, having a viscosity of about 4 pascal-seconds and consisting of about 87 percent of a mixture of volatile cyclopolydimethylsiloxanes and about 13 percent of a nonvolatile polydimethylsiloxane having a plasticity number of about 150 was thoroughly mixed with 5.03 parts of octylphenoxypolyethylene oxide having the CTFA name octoxynol-13 and 4.85 parts of octylphenoxypolyethylene oxide having the CTFA name octoxynol-3 until homogeneous. Then, about 70 parts of deionized water were mixed with the homogeneous mixture, using an impeller stirrer for 30 minutes, to provide a rough emulsion. The rough emulsion was passed, batchwise, 5 times through a colloid mill having a gap setting of 0.04 inches. The temperature of the emulsion was adjusted to about 25° C. before each pass through the colloid mill. The final emulsion of this invention had an average silicone particle size of 3275 Å±115 Å.

EXAMPLE II

The process of Example I was repeated except the rough emulsion was passed continuously through the colloid mill at a rate of 2.2 gallons per minute for a period of 11 minutes. Using a 5 gallon sample size this continuous process was equivalent to a 5-pass batchwise process. The emulsion was circulated by gear pump from the output of the colloid mill to a cooling tank, where it was cooled to about 25° C., then to a reservoir and finally to the inlet of the colloid mill. The final emulsion of this invention had an average particle size of 3350 Å±150 Å.

EXAMPLE III

Example II was repeated except the rough emulsion was divided into three equal-sized portions which were each continuously passed through the colloid mill an equivalent of 5 batchwise passes. The viscosity of the final emulsions ranged from 160 to 200 millipascal-seconds and the average particle sizes ranged from 3258 Å to 3510 Å. The emulsions experienced no separation after being centrifuged at 3000 rpm for 30 minutes and no separation when heat aged at 40° C. for 144 hours. However, they separated after 1 freeze-thaw cycle. The addition of 1.67 parts of propylene glycol to 100 parts of the above emulsions provided emulsions that did not separate during 8 freeze-thaw cycles.

EXAMPLE IV

The polydimethylsiloxane that was used in this example was a bi-modal silicone having a viscosity of about 5 pascal-seconds and consisting of about 87 percent of octamethylcyclotetrasiloxane and about 13 percent of a nonvolatile polydimethylsiloxane having a plasticity number of about 160. One hundred parts of this bi-modal silicone was mixed with 5 parts of $C_8H_{17}C_6H_4O(CH_2CH_2O)_{13}H$ and 2.24 parts of $C_8H_{17}C_6H_4O(CH_2CH_2O)_3H$. The resulting mixture was divided into two equal portions.

One portion was admixed to 50 parts of water, using an impeller stirrer to form a rough emulsion. The rough emulsion was circulated through a centrifugal pump for 10 minutes to provide a fine emulsion of this invention having an average particle size of less than 1 micrometer. This emulsion experienced some separation of the nonvolatile silicone portion over a 24 hour period, but no further separation over a 7 day period.

Water, 50 parts, was admixed to the other portion of the above-described divided mixture using the same impeller stirrer to form a rough emulsion. When this rough emulsion was passed through the same centrifugal pump for 10 minutes a fine emulsion of this invention was obtained which separated no silicone over a period of 8 days.

EXAMPLE V

Each of three one hundred part portions of a bi-modal silicone identical to that used in Example IV, was mixed with 5 parts of octoxynol-13 and either 4.4, 5.5 or 6.6 parts of octoxynol-3. Water, 66.67 parts, was admixed to each of the resulting mixtures and the resulting rough emulsions were circulated through a centrifugal pump for 10 minutes. The samples containing 4.4 and 5.5 parts of octoxynol-3 formed good emulsions. The sample containing 6.6 parts of octoxynol-3 did not form an emulsion.

EXAMPLE VI

One hundred parts of the bi-modal silicone described in Example IV was mixed with 2.24 parts of octoxynol-3. Five parts of octoxynol-13 were mixed with 28.4 parts of deionized water. A rough emulsion was made by admixing the silicone phase into the aqueous phase. The rough emulsion was slowly injected into a centrifugal pump containing an additional 171.6 parts of water and circulated in a closed loop for about 5 minutes The resulting emulsion of this invention was stable at room temperature for 15 days, except for an initial separation of some high viscosity silicone.

That which is claimed is:

1. An emulsification process comprising
   (I) intimately mixing components consisting essentially of (A) 100 parts by weight of a polydimethylsiloxane fluid having a viscosity of up to 50 pascal-seconds at 25° and consisting essentially of from 1 to 100 parts by weight of (i) a nonvolatile polydimethylsiloxane portion having a viscosity of at least 30 pascal-seconds at 25° C. and from 0 to 99 parts by weight of (ii) a volatile polydimethylsiloxane portion and (B) from 1 to 5 millimols, per millimol of primary surfactant, of a nonionic secondary surfactant having an HLB number of from 7 to 9.
   (II) intimately mixing with the mixture of (I) components consisting essentially of (C) at least 3 millimols of a nonionic primary surfactant having an HLB number of from 13 to 15 and (D) an emulsion-forming amount of water to form a rough silicone-in-water emulsion, and
   (III) subjecting the rough emulsion to the comminuting action of a low shear generating means for a period of time sufficient to reduce the average particle size of the silicone to a value less than about 2 micrometers; the temperature of the emulsion being maintained at a value of from about 1° to 40° C. during said subjecting.

2. A process according to claim 1 wherein said low shear generating means is a centrifugal pump and the silicone-in-water emulsion is passed repeatedly through said pump.

3. A process according to claim 1 wherein said low shear generating means is a colloid mill having a gap setting of at least 0.04 inches and the silicone-in-water emulsion is passed repeatedly through the gap, the temperature of the silicone-in-water emulsion being adjusted to a value of from 20° to 30° C. before each pass through the gap.

4. A process according to claim 1 wherein the polydimethylsiloxane fluid (A) is a bi-modal fluid consisting essentially of
   (i) 1 to 75 parts by weight of a nonvolatile polydimethylsiloxane portion having a viscosity at 25° C. of at least 30 pascal-seconds, and
   (ii) 25 to 99 parts by weight of a volatile polydimethylsiloxane portion.

5. A process according to claim 4 wherein the bi-modal polydimethylsiloxane fluid (A) has a viscosity at 25° C. of less than about 10 pascal-seconds.

6. A process according to claim 5 wherein the amount of water (D) mixed in step (II) is from 60 to 100 parts by weight.

7. A process according to claim 6 wherein the nonionic primary surfactant is mixed with the mixture of step (I) and the water is subsequently mixed with the resulting mixture of components (A), (B) and (C).

8. A process according to claim 7 wherein the bi-modal polydimethylsiloxane fluid (A) consists essentially of
   (i) 10 to 20 parts by weight of a nonvolatile polydimethylsiloxane portion having a viscosity at 25° C. of at least 10 kilopascal-seconds, and
   (ii) 80 to 90 parts by weight of a volatile polydimethylsiloxane portion selected from cyclopolydimethylsiloxanes having 4 or 5 silicon atoms per molecule.

9. A process according to claim 8 wherein the nonionic primary surfactant is octylphenoxypolyethylene oxide containing an average of about 13 ethylene oxide units per molecule and is present in an amount of about 5 parts by weight.

10. A process according to claim 9 wherein the nonionic secondary surfactant is octylphenoxypolyethylene oxide containing an average of about 3 ethylene oxide units per molecule and is present in an amount of from 4 to 6 parts by weight.

11. A process according to claim 10 wherein said low shear generating means is a centrifugal pump and the silicone-in-water emulsion is passed repeatedly through said pump.

12. A process according to claim 10 wherein said low shear generating means is a colloid mill having a gap setting of at least 0.04 inches and the silicone-in-water emulsion is passed repeatedly through the gap, the temperature of said silicone-in-water being adjusted to a value of from 20° to 30° C. before each pass through the gap.

13. A bi-modal silicone-in-water emulsion composition consisting essentially of
   (A) 100 parts by weight of bi-modal polydimethylsiloxane fluid component having a viscosity of up to 50 pascal-seconds at 25° C. and consisting essentially of
      (i) 1 to 75 parts by weight of a nonvolatile polydimethylsiloxane portion having a viscosity at 25° C. of at least 30 pascal-seconds and
      (ii) 25 to 99 parts by weight of a volatile polydimethylsiloxane portion,
   (B) from 1 to 5 millimols, per millimol of primary surfactant, of a nonionic secondary surfactant having an HLB number of from 7 to 9,
   (C) at least 3 millimols of a nonionic primary surfactant having an HLB number of from 13 to 15, and
   (D) an emulsion-forming amount of water.

14. A composition according to claim 13 wherein the polydimethylsiloxane fluid (A) has a viscosity at 25° C. of less than about 10 pascal-seconds.

15. A composition according to claim 14 wherein the amount of water is from 60 to 100 part by weight.

16. A composition according to claim 15 wherein the polydimethylsiloxane fluid (A) consists essentially of
   (i) 10 to 20 parts by weight of a nonvolatile polydimethylsiloxane portion having a viscosity at 25° C. of at least 10 kilopascal-seconds and
   (ii) 80 to 90 parts by weight of a volatile polydimethylsiloxane portion selected from cyclopolydimethylsiloxanes having 4 or 5 silicon atoms per molecule.

17. A composition according to claim 16 wherein the nonionic primary surfactant is octylphenoxypolyethylene oxide containing an average of about 13 ethylene oxide units per molecule and is present in an amount of about 5 parts by weight.

18. A composition according to claim 17 wherein the nonionic secondary surfactant is octylphenoxypolyethylene oxide containing an average of about 3 ethylene oxide units per molecule and is present in an amount of from 4 to 6 parts by weight.

19. A silicone-in-water emulsion composition prepared by the method of claim 1.

20. A silicone-in-water emulsion composition prepared by the method of claim 4.

* * * * *